J. HUBMANN.
FRUIT GRADER.
APPLICATION FILED JAN. 14, 1916.
1,199,184.
Patented Sept. 26, 1916.
2 SHEETS—SHEET 2.
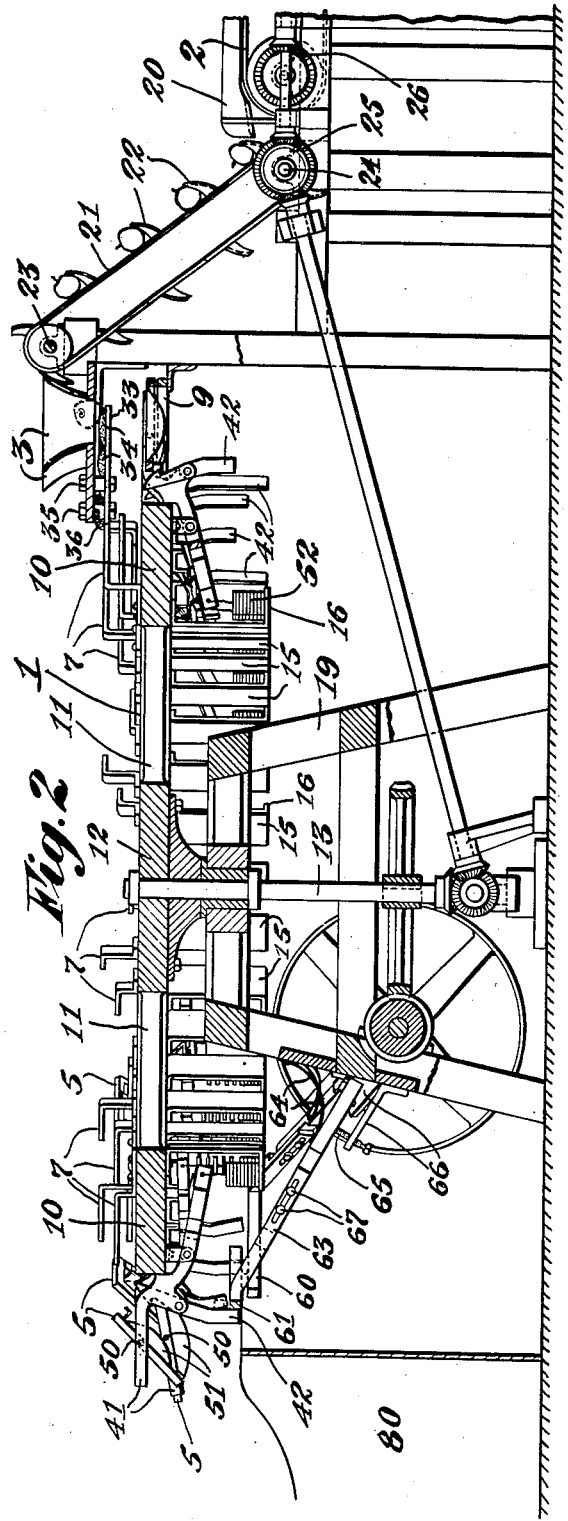
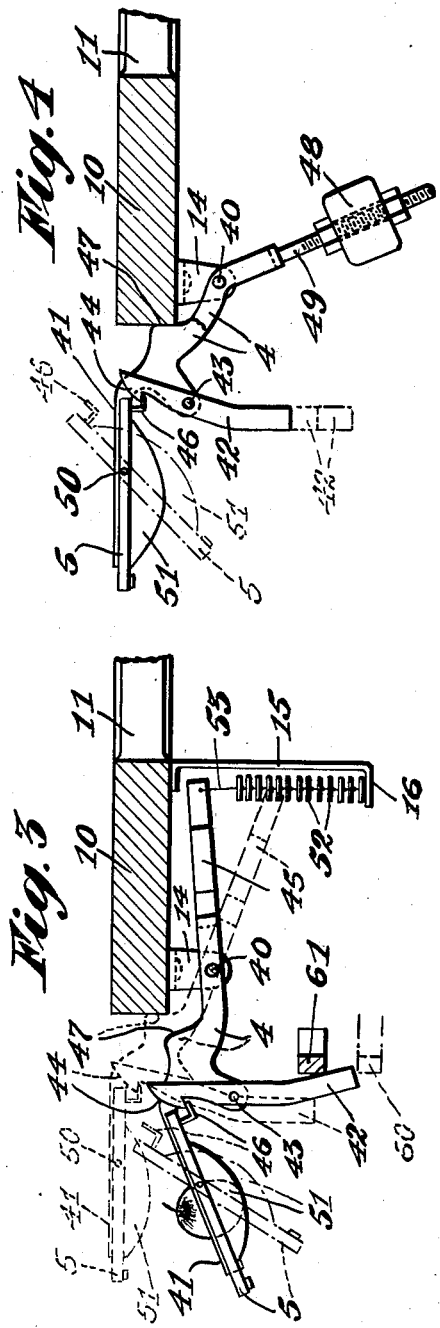
Inventor
Julius Hubmann.
By Reynolds & Sproll
Attorneys

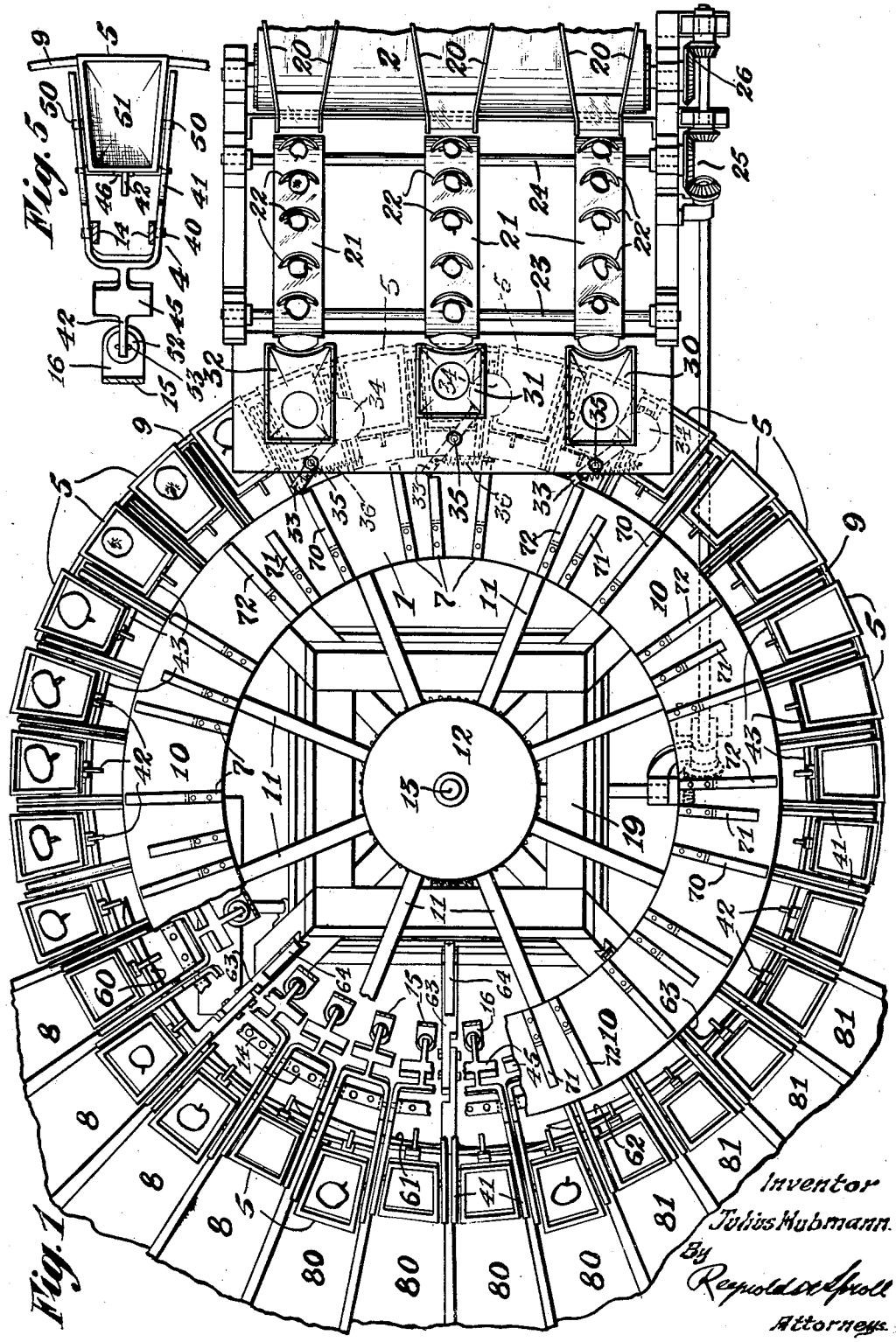

UNITED STATES PATENT OFFICE.

JULIUS HUBMANN, OF NORTH YAKIMA, WASHINGTON, ASSIGNOR OF FIVE ONE-HUNDREDTHS TO J. B. ERNSDORFF, OF NORTH YAKIMA, WASHINGTON, AND TWENTY ONE-HUNDREDTHS TO FRED P. HORSCHEL, OF SELAH, WASHINGTON.

FRUIT-GRADER.

1,199,184.      Specification of Letters Patent.      Patented Sept. 26, 1916.

Application filed January 14, 1916. Serial No. 72,170.

*To all whom it may concern:*

Be it known that I, JULIUS HUBMANN, a citizen of the United States, and resident of North Yakima, in the county of Yakima and State of Washington, have invented certain new and useful Improvements in Fruit-Graders, of which the following is a specification.

My invention relates to fruit grading machines, or machines which are intended for handling fruit after picking and which size it into different sizes, putting all those of one size into the same class.

The object of my invention is to improve upon the mechanism employed and in the character of the work done, as well as to increase the scope of the work done.

The particular objects sought may be determined from an inspection of the following specification and a study of the accompanying drawings.

The particular features which I believe to be novel and desire to protect by this patent, may be seen from the claims which terminate this specification.

In the accompanying drawings I have shown my invention in the form of construction which is most preferred by me at this time. I do not however, desire it to be understood that the particular constructions herein shown are the only ones which may be employed in carrying out my invention.

Figure 1 is a top view or plan of my machine, a portion of the revolving frame being broken away to better show the trip mechanisms located beneath. Fig. 2 is a side view or elevation, the revolving frame and its associated parts being in section. Figs. 3 and 4 show one of the fruit sizing mechanisms respectively in filled and discharged position. Fig. 5 shows a top view of one of these sizing mechanisms.

A characteristic feature of my invention is that I have provided means whereby apples which have been previously graded as to quality, as for instance, the extra fancy, fancy and "C" grades, may all be graded for size at the same time, without danger of mixing the grades.

Another characteristic feature of my invention is the manner of employing a plurality of weights brought successively into action as the means for sizing the apples, or other fruit being operated upon.

Other features which are novel herein may be seen by a study of the specification and drawings.

The machine comprises a fruit delivering mechanism which consists of a belt upon which grading for quality may be done, this being followed next in order by an elevating or feeding mechanism, herein shown as a plurality of belt elevators, followed by the sizing mechanism from which the fruit is discharged, under the control of selective mechanism, to containers provided for the different sizes and grades of fruit.

The fruit is first deposited upon an endless traveling belt or apron 2, upon which grading for quality may be done, if this is desired. Converging guide wings 20 are provided, a pair for each grade of fruit which is to be handled. These are stationary and lead to belt elevators 21 which pass over pulleys carried upon shafts 23 and 24. These belts are provided with wings or cleats 22 of such shape and size that they will catch and raise one fruit only. The elevator belts deliver the fruit into pockets, 30, 31 and 32, which have holes in their bottom of such size as will permit free passage of the largest fruit intended to be handled by the machine. These openings are normally closed by a trip member which consists of a lever 33, pivoted at 35 and having a head of sufficient size that when it is under the opening in the pocket 30, 31 or 32, it will prevent passage of the fruit. When this is swung to one side, as they are shown in Fig. 1, the fruit will be discharged. To prevent bruising of the fruit as it falls into these hoppers, the trip members 33 have a pad 34 upon their upper surface, which eases the blow and saves the fruit from bruising.

The sizing mechanism is mounted upon a movable member which carries a plurality of series of individual-fruit containers, each provided with means for sizing the fruit by weight, and means which may coöperate with other means to selectively discharge the fruit so as to group all fruit of the same grade and size in the same final container.

The movable member which carries the sizing means is herein shown as a wheel like frame mounted to turn upon a vertical shaft 13. This frame consists of a central hub 12, spokes 11, and rim 10. About the periphery of this frame are placed a series of individual-fruit containers which are provided with means adapted to coöperate with other means to size the fruit and deliver each size and grade to its respective discharge conveying mechanism. One of these individual-fruit containers and the parts associated therewith is shown in different positions, in Figs. 3, 4 and 5. In Figs. 3 and 4 a section of the rim 10 is shown. Upon this, closely spaced together, are the individual-fruit containers. Each of these is mounted upon a frame or lever 4 which is pivoted, as at 40, upon brackets 14 of the frame 10. The outer end of this lever is forked to form a yoke 41, between the divergent elements of which is pivoted a frame 5 to which is secured canvas or like fabric 51 to form a basket or cup adapted to receive and hold a single fruit. The pivots 50 are so located that the natural tendency of the frame is to swing into discharge position when unrestrained.

At its inner end frame 5 is provided with a catch plate 46 which is engageable by the tooth 44 of a catch and trip lever 42, which is pivoted at 43 upon the lever 4 and has its larger, or heavier end, depending, so as to be engaged by a coöperative member, to be thereby actuated to release the frame 5 when it reaches a certain position in the path of its travel. This point will vary with the grade of fruit and also with its size. The weight of the end of the lever which carries the fruit is partly counterbalanced by a weight, as 45, carried by the opposite end of the lever. The counterbalancing of the weight of the fruit is secured by connecting with the same end of the lever a series of weights which are successively brought into action as the weight of the fruit causes the lever to be swung downward. These weights 52 are shown as a series of thin metal disks, secured together by means which will permit slight separation of the weights and also permit their settling together when lowered. The fixed counterbalance of the lever 4 should be such that when no fruit is carried thereby it will swing into its uppermost position, as is shown by dotted lines in Fig. 3 and full lines in Fig. 4, in which position a shoulder 47 contacts with the rim 10. The addition of a fruit to the container 5, will cause this end of the lever to fall, which will bring into action a number of the weights 52 proportioned to the weight of the fruit. When not in use these weights are supported from ledges or brackets 16 which are supported from the rim 10. I have shown bars 15 secured upon the rim 10 and having their lower ends laterally bent to form a ledge for the support of the weights.

The individual-fruit containers are divided into as many series as there are separate feeding mechanisms. As there are three of the feeding elevators 21 herein shown, the sizing means would be divided into three series. Every third container would be in the same series.

The fruit fed by each elevator is supposed to be of the same grade but of different sizes, while the fruit of the different elevators differ in grade but are made up of a like variety of sizes. The inwardly projecting ends of the pivoted levers 33, which detain the fruit in the pockets 30, 31 and 32 until the proper container comes beneath, differ in length or inward projection. They may also differ in vertical position, as is shown in Fig. 2.

The rim 10 of the revolving frame carries a series of tripping arms or fingers 7 which are divided into a like number of series as are the feeding and sizing mechanisms, in this case three. These are different, either in length or vertical position, or in both, as has been herein shown, to correspond with the position of the levers 33, so that the arms of one series will contact only with the lever 33 which conforms in position therewith. It thus follows that the fruit of one grade are all deposited in one series of sizing mechanisms while the fruit of the other grades are each deposited in the corresponding series of sizing mechanisms.

A plurality of series of discharge receiving and conveying means are provided for receiving the fruit as finally discharged after sizing. The number of series will conform to the number of series of feeding and sizing mechanisms. In the apparatus shown this would be three. The number of these in each series would be determined by the number of sizes for which the machine was designed. As here shown there are four sizes provided for in each grade. The chutes 8 receive all the fruits of one grade, each chute receiving all of these fruits which are of one size. Similarly the chutes 80 receive the fruits of another grade and the chutes 81 those of another grade.

The containers 5 are tripped and their contents deposited in the proper chute in the series 8, 80, or 81, by means of curved bars 60, 61 and 62. One of these bars is placed opposite its respective series of chutes, 8, 80 or 81. The bars 60, 61, and 62 are set at different elevations, and the lengths of the corresponding trip arms 42, controlling the containers of each grade vary accordingly, so that the shortest arm 42 will be tripped only by one bar, as 62; the next longer arm 42 will miss the bar 62 altogether, and will be tripped only by bar 61, being too short to be tripped by bar 60; the longest of the arms 42 will not be sufficiently depressed to strike bars 62 and 61, but will be tripped by bar 60, the lowest in position. These bars 60, 61 and 62, may be so arranged that the series of containers having the longest arms 42 may be tripped first, thus avoiding all possibility of interference with the following bars, 61 and 62. These bars 60, 61, and 62, are not arranged concentric to the rim 10, but curve outward, gradually increasing their distance from the center. The bars 42 are depressed varying distances. The bars 60, 61 and 62 are each so arranged with respect to the different chutes in its series 8, 80 or 81, that as a container with an apple of a given weight comes past, the arm 42 being depressed a given amount for this weight, the bar will engage the inner side of arm to trip it, and the fruit will be deposited in the chute which is intended to receive this particular weight. All the fruit of one grade are deposited in the chutes 8, the next grade being distributed in the chutes 80, and those of the third grade being distributed in the chutes 81.

The tripping bars 60, 61 and 62 are adjustably supported through extension bars composed of two pieces 63 adjustable by means of slots and securing bolts 67. These bars are pivotally mounted at their inner ends and are held down by springs 64 and adjusted in elevation by set bolts 65 which pass through brackets 66 carried upon the supporting frame 19.

In Fig. 4 a modified construction is shown, this having the inner end of the lever which carries the fruit containers extending downward at rather a sharp angle and provided with an adjustable counterweight 48. Fruit of different weight will depress the outer end of the lever different amounts because of the differing effect which the weight would have because of the differing angle of the arm 49 of the lever.

The movements of the parts are coördinated by employing gears and shafts to connect and drive the parts, thereby securing proper timing.

What I claim as my invention and desire to secure by Letters Patent is:

1. In a fruit grader, in combination, a plurality of fruit feeding mechanisms, a conveying mechanism having thereon a corresponding number of series of fruit receivers and a weighing mechanism associated with each fruit receiver, means for selectively transferring fruits from each feeding mechanism only to receivers of its particular series, and weight-controlled selective discharging means for the fruit receivers.

2. In a fruit grader in combination, a plurality of fruit feeding mechanisms, a revolving frame having individual fruit containers disposed in a like number of series, means associated with said containers selectively controlling the fruit feeding mechanisms, a weighing means for each container and selective discharging means for each container controlled by the weighing means.

3. In a fruit grader, in combination, a plurality of fruit feeding mechanisms, a revolving frame having individual-fruit containers disposed in a plurality of series corresponding in number with the number of fruit feeding mechanisms, means for depositing the fruit from each feeding mechanism in containers of its particular series, and selective discharging means for said containers comprising a weighing mechanism carried with each fruit container.

4. In a fruit grader, in combination, a revolving frame having a plurality of series of individual-fruit containers, a like plurality of series of receiving receptacles, and selective means for discharging the individual-fruit containers each into a receptacle of the corresponding series, of receptacles comprising a weighing mechanism associated with each individual fruit container.

5. In a fruit grader, in combination, a revolving frame having a plurality of series of individual-fruit containers, a like number of series of receiving receptacles, each series containing a plurality of receptacles, and means for selectively discharging the fruit containers each into a receptacle of its series comprising a weighing mechanism associated with each individual fruit container.

6. In a fruit grader, in combination, a fruit supply source divided into a plurality of compartments, a separate fruit feeding device for each of said compartments, a timing pocket for each fruit feeding device receiving the fruit delivered thereby, a tripping member for each pocket, a revolving frame having a series of individual fruit containers passing beneath said timing pockets, selected trip actuating members carried by said revolving frame, and fruit-weighing means and trip-actuating members carried by said revolving frame, and selectively controlled by the weighing means.

7. In a fruit grader, in combination, a fruit supply source divided into a plurality of compartments, a separate fruit feeding device for each of said compartments, a timing pocket for each fruit feeding device receiving the fruit delivered thereby, a tripping member for each pocket, a revolving frame having a series of individual-fruit containers passing beneath said timing pockets, and selective trip actuating members carried by said revolving frame, fruit weighing means associated with each fruit container, and discharging means selectively controlled by the weighing means.

8. A fruit grading machine comprising a rotative frame, a series of levers pivoted about the periphery of said rotative frame, individual-fruit containers carried by one end of each lever, a discharge means associated with each container and comprising a projecting trip arm, said containers being grouped in a plurality of series, the trip arms of each series being located differently from those of the other series, a fixed releasing member for each series located each within its respective sector of the path of movement of the containers and in position to engage only the trip arms of its respective series and a weighing means carried by each lever and determining, within its discharging sector the point of release of the individual-fruit containers.

9. A fruit grading machine comprising a rotative frame, a series of levers pivoted about the periphery of said rotative frame, individual-fruit containers carried by one end of each lever, a discharge means associated with each container and comprising a projecting trip arm, said containers being grouped in a plurality of series, the trip arms of each series being located differently from those of the other series, a fixed releasing member for each series located each within its respective sector of the path of movement of the containers and in position to engage only the trip arms of its respective series, and a weighing means for each individual-fruit container determining the point within its discharging sector where the fruit is released, and means for adjusting the position of said releasing member.

Signed at North Yakima, Washington, this 31st day of December, 1915.

JULIUS HUBMANN.